United States Patent
Olin et al.

(10) Patent No.: US 6,687,900 B1
(45) Date of Patent: Feb. 3, 2004

(54) METHOD AND SYSTEM FOR LOADING INSTRUCTIONS INTO AN EXECUTING PROCESS

(75) Inventors: Gregg R. Olin, Fairport, NY (US); Brian S. Pagano, Farmington, NY (US)

(73) Assignee: X/Net Associates, Inc., Fairport, NY (US)

(*) Notice: Subject to any disclaimer, the term of this patent is extended or adjusted under 35 U.S.C. 154(b) by 0 days.

(21) Appl. No.: 09/443,586

(22) Filed: Nov. 19, 1999

Related U.S. Application Data

(60) Provisional application No. 60/109,049, filed on Nov. 19, 1998.

(51) Int. Cl.[7] .................................................. G06F 9/44
(52) U.S. Cl. ..................... 717/170; 717/120; 717/123; 717/127; 717/131; 717/169
(58) Field of Search ......................... 717/101, 102–103, 717/120, 123, 127, 131, 169–170; 709/229, 236, 239–240

(56) References Cited

U.S. PATENT DOCUMENTS

| | | |
|---|---|---|
| 5,680,645 A | 10/1997 | Russell et al. |
| 5,796,940 A | 8/1998 | Nagashima |
| 5,802,544 A | 9/1998 | Combs et al. |
| 5,987,463 A | 11/1999 | Draaijer et al. |
| 6,026,404 A * | 2/2000 | Adunuthula et al. .......... 707/10 |
| 6,247,056 B1 * | 6/2001 | Chou et al. .................. 709/229 |
| 6,314,474 B1 * | 11/2001 | Walter et al. ................. 710/14 |
| 6,334,114 B1 * | 12/2001 | Jacobs et al. ................. 705/26 |

OTHER PUBLICATIONS

IBM Technical Disclosure Bulletin, "Modification of Programs in Disk Core Image Format," vol. 15, No. 3, pp. 994–995 (1972).

Ford et al., "Evolutionary Development of the Multi–function "RAP" Explosive Operated Switching Cartridge," IEEE, vol. 29, No. 1, pp. 943–948 (1993).

Malhis et al., "Modeling Recycle: A Case Study In The Industrial Use of Measurement and Modeling," IEEE, pp. 285–294 (1995).

Eitel, "Backup and Storage Management in Distributed Heterogeneous Environments," IEEE, pp. 124–126 (1994).

* cited by examiner

*Primary Examiner*—Tuan Dam
*Assistant Examiner*—Ted T. Vo
(74) *Attorney, Agent, or Firm*—Nixon Peabody LLP

(57) ABSTRACT

A method for loading instructions into an executing process includes: executing a first application comprising at least one cartridge selected from a set of cartridges; instantiating a second application comprising at least one of the cartridges selected from the set of the cartridges with the first application during the execution of the first application; and executing the second application instantiated with the first application.

19 Claims, 3 Drawing Sheets

METHOD AND SYSTEM FOR LOADING INSTRUCTIONS INTO AN EXECUTING PROCESS

This application claims the benefit of U.S. Provisional Patent Application Serial No. 60/109,049 filed on Nov. 19, 1998 which is herein incorporated by reference.

FIELD OF THE INVENTION

This invention relates a method and system for loading instructions into an executing process.

BACKGROUND OF THE INVENTION

With prior computer systems, instructions for one or more applications are entered into the system, compiled, and then executed. If changes, updates, and/or upgrades needed to be made to one or more of the existing applications being executed by these prior systems, the new instructions would be added into or would replace instructions in one or more of the applications source code, and then the old and the new instructions would be recompiled. One or more of the existing applications executing on the computer system would have to be shut down, a physical replacement of executable code would need to be introduced to the computer system, and the new executable code would have to be executed on the computer system. Although this process works, it still requires a disruption to the users of the system, especially to those systems needing to support twenty-four hour processing.

By way of example, a lender may execute a consumer lending application in a computer system to process loans for customers from a twenty-four hour call center. If the lender decides to change, update, and/or upgrade a portion of the consumer lending application, the lender would need to stop the execution of the consumer lending application, replace the existing executable code with the newly compiled executable code, and then execute the new executable code. Accordingly, the lender is unable to process any loans while the change, update, and/or upgrade of the consumer lending application takes place, resulting in users having to log off and then back on, at some predetermined time, and unnecessary downtime in the processing of loans.

SUMMARY OF THE INVENTION

A method for loading instructions into an executing process in accordance with one embodiment of the present invention includes a few steps. First, a first application comprising at least one cartridge selected from a set of the cartridges stored in a memory is executed. While the first application is being executed, a second application comprising at least one of the cartridges is instantiated with the first application. Once the second application is instantiated with the first application the second application is executed.

A computer readable medium in accordance with another embodiment of the present invention has stored thereon instructions which, when executed by a processor, cause the processor to perform the steps of: executing a first application comprising of at least one cartridge in a set of cartridges; instantiating a second application comprising of at least one of the cartridges selected from the set of the cartridges with the first application during the execution of the first application; and executing the second application instantiated with the first application.

A system for loading instructions into a process being executed by a processor in accordance with yet another embodiment of the present invention includes a memory device, an instantiator, and an executing device. The memory device stores a set of cartridges. The instantiator is configured to instantiate a first application comprising at least one cartridge selected from the set of the cartridges stored in the memory. The executing device is configured to execute the instantiated first application, wherein the instantiator is configured to instantiate a second application comprising at least one of the cartridges with the first application during the execution of the first application and the executing device is configured to execute the second application instantiated in the first application.

With the present invention, software instructions that were not available and/or written at the time of compilation of software instructions for an application that is currently being executed can be loaded in and executed with the currently executing software instructions. This represents a significant departure from the normal compile-time requirements in prior systems which required all of the instructions for an application to be known at the time of compilation. Accordingly, this substantially reduces downtime and enhances overall efficiency.

DETAILED DESCRIPTION

Figure 3:
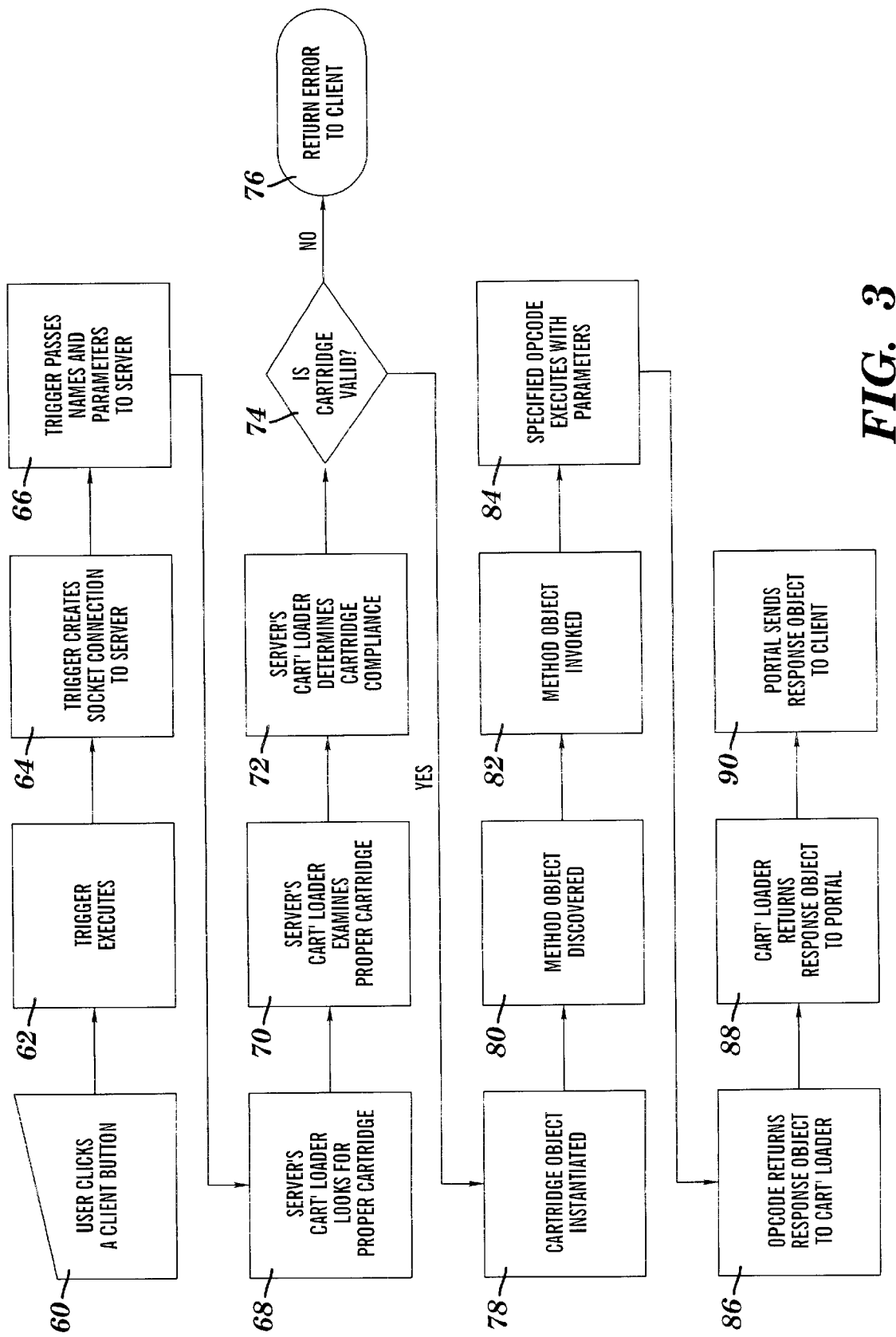
FIG. 3 is a flow chart of a method for loading instructions into an executing process for loading instructions into an executing process in accordance with one embodiment of the present invention.

A method for loading instructions into an executing process in accordance with one embodiment of the present invention is illustrated in FIG. 3. In this particular embodiment, the method includes executing a first application comprising at least one cartridge selected from a set of cartridges, instantiating a second application comprising at least one other of the cartridges selected from the set of the cartridges with the first application during the execution of the first application, and then executing the second application instantiated with the first application. Accordingly, with the present invention software instructions that were not available and/or written at the time of compilation of software instructions for an application that is currently being executed can be loaded in and executed with the currently executing software instructions.

Figure 1:
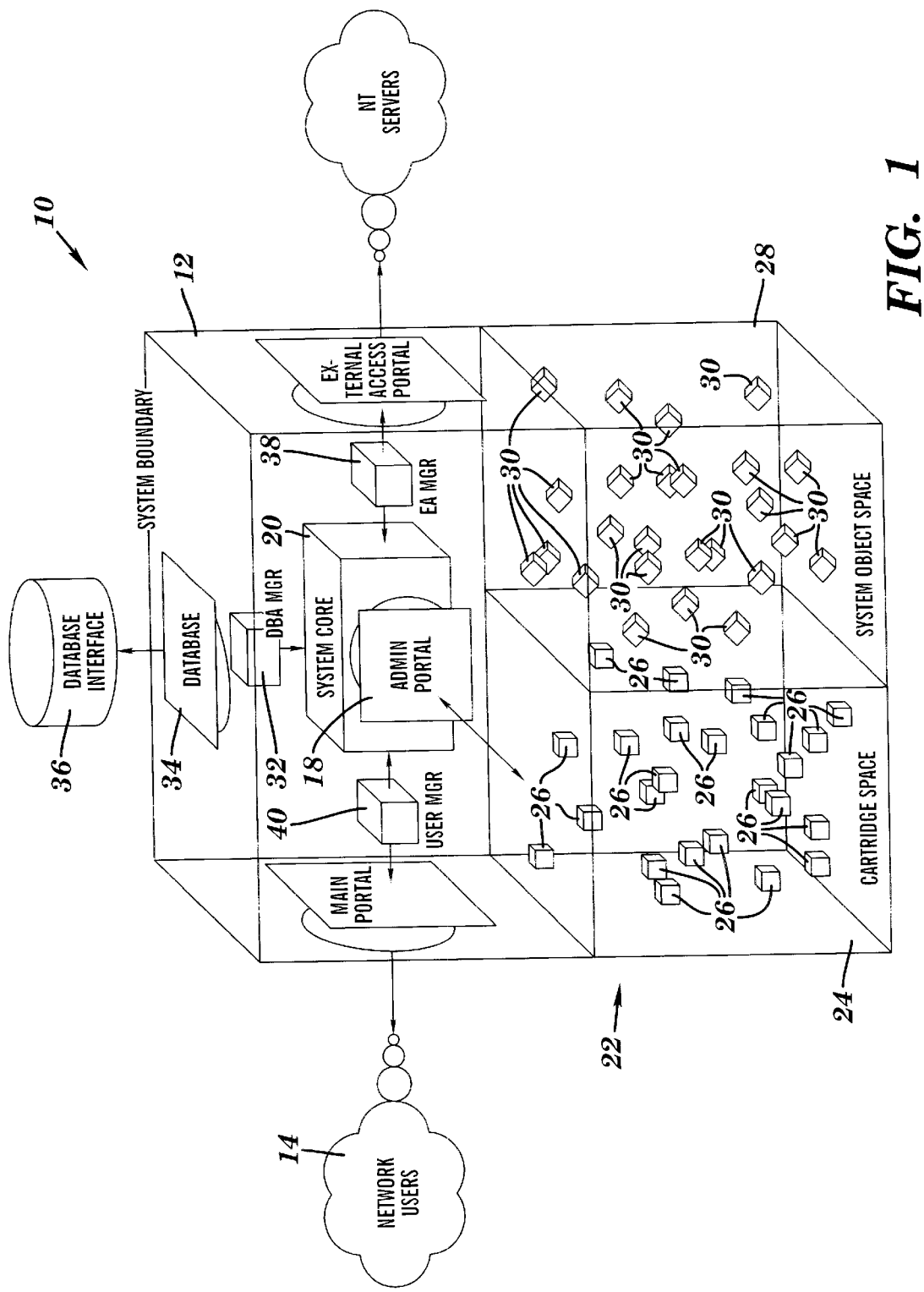
FIG. 1 is a block diagram of a system for loading instructions into an executing process in accordance with one embodiment of the present invention.

Referring to FIG. 1, a system 10 for loading instructions into an executing process in accordance with one embodiment of the present invention is illustrated. In this particular embodiment, the system 10 comprises a server 12 which is programmed with the method for loading instructions into an executing process and is coupled to a network of users 14 which are a plurality of computer work station systems 16, although other types of systems could be used, such as a stand alone computer system programmed with the method for loading instructions into an executing process. Additionally, although a server is shown in this particular example, other types of small and large computer systems could be used in place of the server 12. Since the components and general operation of computer systems, such as servers and computer work station systems, are well known to those of ordinary skill in the art, they will not be discussed in detail here.

In this particular embodiment, the server 12 includes a system core 18 which has a processor 20, such as a central processing unit or other processing logic device. Although in this particular one processor is shown, the server 12 can have multiple processors as needed or desired. The processor 20 executes the instructions for the method for loading instructions into an executing process, as well as, other instructions for other types of applications, such as a consumer loan application, a word processing application, etc., that may be run by the server 12.

A memory 22 is coupled to the processor 20 in the system core 18. Although in this particular embodiment one memory 22 is shown, the server 12 can have multiple memories as needed or desired. The memory 22 may be any type of storage device, such as a random access memory (RAM) or a read only memory (ROM) and may also comprise a disk, CD ROM, or other type of magnetic or optical reading and/or writing drive system that is coupled to the processor 20 and which can receive, read data from and/or write data to a computer readable medium, such as a floppy disk, hard disk, or CD ROM. The instructions for the method for loading instructions into an executing process in accordance with the present invention are stored in the memory 22, which again may comprise a computer readable medium. In this particular embodiment, the memory 22 comprises a cartridge space 24 which stores a plurality of cartridges 26 and system object space 28 which stores a plurality of system objects 30. Each of the cartridges 26 has at least one executable instruction and each of the system objects 30 has at least one executable instruction. In this particular embodiment, the instructions for the method for loading instructions into an executing process in accordance with the present invention are stored as one or more cartridges 26 and/or objects 30 in the memory 22.

In this particular embodiment, the server 12 also comprises a database access (DBA) manager 32 and a database 34 which are coupled to a database interface 36 and to the processor 20 in the system core 18. The DBA manager 32 handles requests for and retrieves data from the database 34, such as a loan applicant's name and address, net worth, loan history, etc., for use by the processor 20 when executing an application or applications. With respect to data that is not stored in the database 34, the DBA manager 32 interacts with the database interface 36 to retrieve data from external databases.

In this particular embodiment, the server 18 also comprises an external access (EA) manager 38 which is also coupled to the processor 20 in the system core 18. The EA manager 38 handles requests for and retrieves information from external sources, such as requesting and retrieving a loan applicant's credit report, for use by the processor 20 when executing an application or applications.

In this particular embodiment, the server 12 also comprises a user manager 40 which is coupled to a plurality of network users 14 and to the processor 20 in the system core 18. The user manager handles the transfer information, such as data, instructions, requests, or responses, between the network users 14 and the system core 18. A variety of different communication systems and/or methods can be used to couple the server 12 to each of the computer work station systems 16 in the network users 14, such as a local area network, a wide area network, the world wide web, modems and phone lines, wireless communication technology, etc. Since the operation of these communication systems are well known to those of ordinary skill in the art they will not be discussed here.

Figure 2:
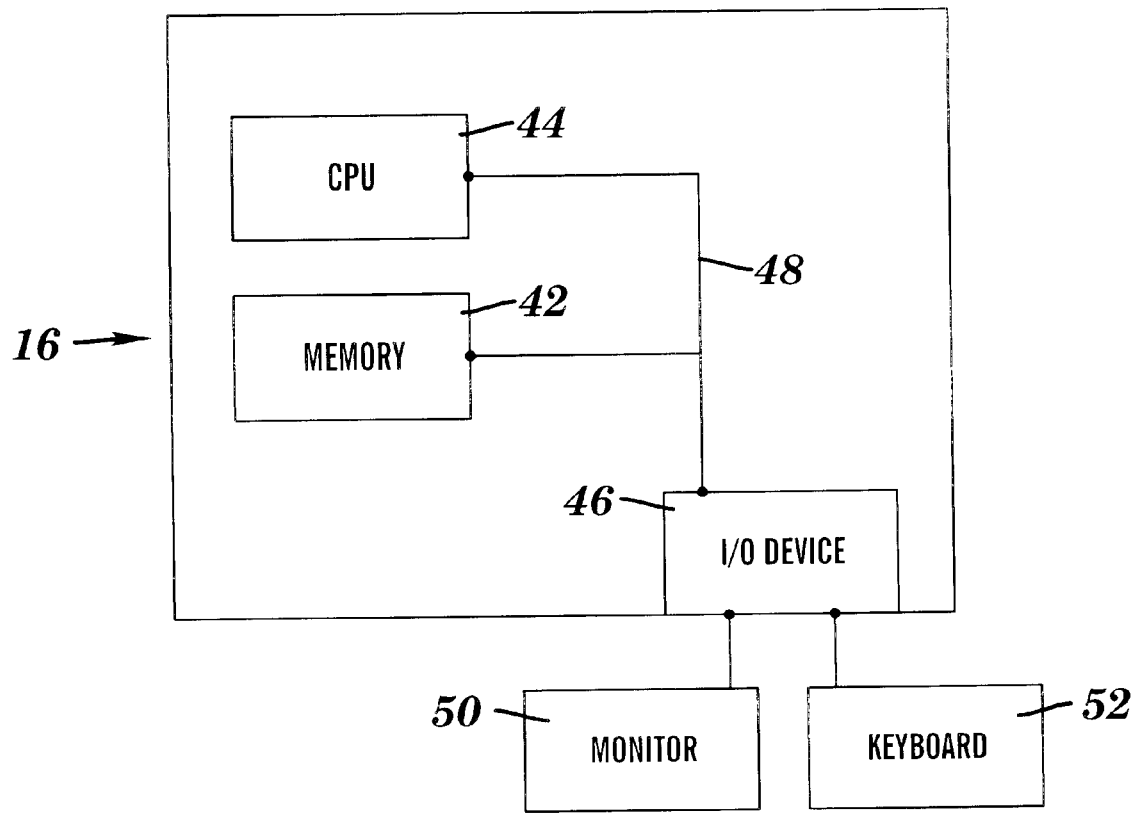
FIG. 2 is a block diagram of a computer system used in the system shown in FIG. 1.

Referring to FIG. 2, one of the computer workstation systems 16 in the network of users 14 is illustrated. In this particular embodiment, each of the computer work station systems 16 in the network of users include a memory 42, a processor or central processing unit 44, an input/output (I/O) device 46, and a bus 48 which couples all of these components together. The memory 42 in the computer work station system 16 may also store the instructions for the method for loading instructions into an executing process in accordance with the present invention along with other instructions for one or more other applications, such as a consumer loan application or a word processing application, for execution by the processor 44. The processor 44 can execute one or more applications independently of the server 12, such as the method in accordance with the present invention. Although the above discussed embodiment discloses the implementation of the method in accordance with present invention in a system 10 with a server 12 and a plurality of networked computer work station systems 16, the present invention can also be implemented in a general purpose personal computer system, such as computer work station system 16, programmed with the method in accordance with the present invention.

The memory 42 may be any type of storage device, such as a random access memory (RAM) or a read only memory (ROM) and may also comprise a disk, CD ROM, or other type of magnetic or optical reading and/or writing drive system that is coupled to the processor 44 and which can receive, read data from, and/or write data to a computer readable medium, such as a floppy disk, hard disk, or CD ROM. The instructions for the method for loading instructions into an executing process in accordance with the present invention may also be stored in memory 42. The memory 42 may also comprise a cartridge space which stores a plurality of cartridges 26 and system object space 28 which stores a plurality of system objects 30. The instructions for the method for loading instructions into an executing process in accordance with the present invention may be stored as one or more cartridges 26 and/or objects 30 in the memory 42.

The processor 44 at the computer work station system 16 can also carry out some other functions. In this particular embodiment, the processor 44 can initiate a request to the server 12 to instantiate one or more objects 30 or cartridges 26 into an application and then execute the application at the server 12. The processor 44 can also initiate a request to the server 12 to instantiate other objects for another application into the first application while the first application is being executed by the server 12 and can receive responses back based on the execution of each of the applications. The processor may also execute the instructions for the method for loading instructions into an executing process in accordance with the present invention stored in the memory 42, particularly if the computer work station 16 is acting independently as the system 10.

In this particular embodiment, the computer work station system 16 also each include a monitor 50 which is coupled to the I/O device 46. Any type of device which can convey information to the user of the computer work station system 16, such as a computer monitor, a television, an LCD, or an LED, can be used as the monitor 50.

In this particular embodiment, the computer work station system 16 also each include a keyboard 52, although types of user input devices, such as computer mouse, can be used with or in place of the keyboard 52. The keyboard 52 or other user input device provides a mechanism for a user or operator of the computer work station system 16 to generate and transmit signals or commands to the computer work station system 16, such as requests for the execution of a particular application.

Although not shown it would be readily apparent to one of ordinary skill in the art that each of the computer work station systems 16 can contain other components typically found in computer systems and can contain multiple processors, memories, and I/O devices as needed or desired. Since the components and general operation of a general computer, such as the computer work station system, are well known to those of ordinary skill in the art, they will not be discussed in detail here. Although system 10 is shown with a computer work station system 16 coupled to a server 12, the computer work station system 16 can be programmed with the method in accordance with the present invention in memory 42 to be executed by processor 44 to act independently as system 10.

The operation of the method for loading instructions into an executing process in accordance with one embodiment of the present invention will be discussed with reference to FIGS. 1–3. First, a user will enter a request into one of the computer work station systems 16 for a first application to be executed or run using the keyboard 52 or another user input device. The processor 44 in the computer work station system 16 receives the request and generates and transmits a request to the server 12 for the execution of the first application.

The processor 20 in the server 12 receives the first request for the first application and identifies one or more of the cartridges 26 in the memory 22 needed for the first application. The processor 20 retrieves the identified cartridges 26 from the memory 22, instantiates the cartridges 26, and then executes the instantiated cartridges 26 which form the first application. During the execution of the first application, information, such as data, instructions, requests, and responses, can be transmitted between the computer work station system 16 and the server 12. In an alternative embodiment, if the computer work station system 16 is working independently as the system 10, the processor 44 would receive the request, identify one or more cartridges 26 in memory 42, retrieve the identified cartridges 26, instantiate the retrieved cartridges 26, and then execute the instantiated cartridges 26 which form the first application.

Next, an operator may create and store a cartridge or cartridges 26 which contain one or more instructions for a new application which includes a change, update, and/or upgrade of instructions in an existing application. Typically, each of the cartridges 26 is compiled prior to storage in the memory 22 and/or in memory 42.

The cartridge 26 extends a class which defines and/or implements the basic functionality that every cartridge will contain. In this particular embodiment, the class includes a field's list that includes: a name of the cartridge 26; an internet protocol (IP) address of the server 12 to enable contact with the server 12; an IP address of the cartridge 26 to enable-contact with other cartridges 26, programs, and/or applications; a port number to connect to in the server 12; Booleans to indicate the type of cartridge, such as an External cartridge, a Manager cartridge, a Service cartridge, or an AutoInvoke cartridge; and a maximum log size that this cartridge's error log method will produce, although the cartridge 26 could contain other fields as needed or desired. In this particular embodiment, an External cartridge interacts with an external program or service, the Manager cartridge has special duties in organizing a loan type and/or periodically scanning for newly introduced cartridges, the Service cartridge runs continuously as a background process, and an AutoInvoke cartridge may be started without an explicit command from a user.

Additionally, in this particular embodiment the cartridge class 26 defines and implements: all accessor/mutator functions for the fields defined above; errLog( ) method for writing the error file; a ReadIniFile( ) which loads the configuration file for this cartridge 26; and a ContactSystem( ) which implements socket communication with the server's main portal, although the cartridge 26 can define and implement other functions and files or code as needed or desired. 20 Since a program or executable instructions for files, such as a writing an error log file, an errLog( ) method, reading an ini file, a ReadlniFile( ) method, and making a socket connection, a ContactSystem( ) method are well known to those or ordinary skill in the art, they will not be discussed here.

Further, in this particular embodiment, the class of the cartridge 26 also defines, but does not implement: GetOpCodes( ) which returns a list of all the opCodes registered by this cartridge 26; and DoOpCode( ) which executes a command that is passed into the cartridge 26, although the cartridge 26 can define and not implement other files or code as needed or desired.

When a user desires to instantiate a new application into an existing application which is currently being executed, then in step 60 the user or operator uses the keyboard 52 or another user input device to select and signal the processor 44 in the computer work station system 16 that the new application has been selected. Next, in step 62 the signal from step 60 causes the processor 44 to execute a trigger signal which makes a socket connection with the server 12 in step 64. In this particular embodiment, the trigger signal also contains information about: the name of the cartridge or cartridges 26 to use; the name of the command (opCode) to call on that cartridge or cartridges 26; and any parameters that accompany that command, although the trigger signal can contain other information as needed or desired.

In step 66 the server 12 reads information on the trigger signal, and then in step 68 the server 12 uses its Cartridge-Loader class to find the requested cartridge or cartridges 26. The Cartridge Loader is a class that finds cartridge files, loads, checks, and manages (organizes) the cartridges. Since a program or executable instructions for a CartridgeLoader are well known to those or ordinary skill in the art, it will not be discussed here. In an alternative embodiment, if the computer work station system 16 is working independently as a system 10, than the processor 44 receives the request for the new application by the user input device and finds the requested in cartridge or cartridges 26 in memory 42.

Next, in step 70 the CartridgeLoader examines the directory for the memory 22 in which the cartridges 26 are stored and in this particular embodiment determines: if the requested cartridge or cartridges 26 exists in any form; if there are multiple versions of the cartridge or cartridges 26, which version of each cartridge 26 is the newest; if this cartridge or cartridges 26 belong to a server 12 activity, in other words a pre-defined group of cartridges that have been assigned specific access rights; and if the user or the computer work station system 16 making the initial request has rights to access that cartridge or cartridges 26, although the processor 20 can make other determinations as needed or desired. In an alternative embodiment, if the computer work station system 16 is working independently as a system 10, than the processor 44 examines the directory for the memory 42 which the cartridges 26 are stored and makes the above-identified determinations described above.

Next, in step 72 in this particular embodiment the Car-tridgeLoader uses the method Class.forName( ) to receive a Class object representing the meta-information about this cartridge or these cartridges 26. The method Class.forName() is a Java method that implements reflection. Since a program or executable instructions for the method Class.forName( ) are well known to those or ordinary skill in the art, they will not be discussed here. Additionally, in this step 72 in this particular embodiment the CartridgeLoader calls a number of methods on this Class object to determine if the requested cartridge or cartridges 26 are compliant with the requirements for a cartridge application programming interface (API). In this particular embodiment, these methods include calling up a Class.getMethods( ) which is a Java method used in reflection and a Class.getMethod(methodName) which is a Java method used in reflection to identify the necessary methods in the cartridge or cartridges 26. Since a program or executable instructions for a Class.getMethods( ) and for a Class.getMethod(methodName) are well known to those or ordinary skill in the art, they will not be discussed here. In this particular embodiment, the necessary methods include a (doOpCode( ), a 'no-args' constructor, getOpCodes, isAutoInvoke( ), isManager( ), isMilestone( ), isService( ), errLog( ), contactSystem( )) although fewer or more methods can be used depending upon the particular system. The (doOpCode( ) is a method within our invention for executing an opcode in a cartridge. The 'no-args' constructor is an object constructor that receives no parameters (arguments). The getOpCodes is a method for returning the list of opcodes defined in this cartridge. The isAutoInvoke( ) is a method for determining the state of the autoInvoke flag for this cartridge. The isManager( ) is a method for determining the state of the isManager flag. The isMilestone( ) is a method for determining the state of a isMilestone flag. The isService( ) is a method for determining the state of a isService flag. The errLog( ) is a method to write out error files. The contactsystem( ) is a method which implements socket communication with MetaSage's main portal). In an alternative embodiment, if the computer work station system 16 is working independently as the system 10 than the processor 44 obtains a class object representing the meta-information about the cartridge or cartridges 26 and determines if the cartridge or cartridges 26 are compliant with the requirements for the cartridge application programming interface as described in greater detail above.

If all of the necessary methods are present then in step 74 the cartridge is determined to be a valid and the YES branch is taken. If all of the necessary methods are not present, then the NO branch is taken and in step 76 the server 12 sends the computer work station system 16 an error signal or if the computer work station system 16 is working independently it generates its own error signal.

If the YES branch is taken, then in step 78 an instance of the class (which is the new cartridge) is created and then the cartridge or cartridges 26 for the new application are instantiated with the cartridges for the currently executing application. The system 10 is able to instantiate a cartridge or cartridges 26 into a currently executing application because of the steps described in detail earlier. Basically, the system 10 is programmed with a manager cartridge which periodically scans for newly introduced cartridges 26.into memory 22. As described in greater detail earlier, these newly introduced cartridges 26 undergo a verification process to determine whether or not they will be compliant. If the cartridges 26 are compliant, then they can be entered into and executed in and with other executing instructions when requested by an operator without any interruptions. As a result, one of the advantages of the present invention is that the functionality in the instructions in the cartridges 26 are available to the system 10 without requiring a system 10 to have to shut down and recompile any newly introduced code. In an alternative embodiment, if the computer work station system 16 is working independently as a system 10, than the cartridges or cartridges 26 for the new application are instantiated with the cartridges 26 for the current executing application within computer work station system 16.

Next, in step 80 the method doOpCode( ) in the new cartridge or cartridges 26 are discovered via the Class.getMethod( ) method call which returns a Method object in server 12. The method doOpCode( ) is a method defined in the Xcartridge class and the Class.getMethod( ) is a Java method. The Method object is invoked in step 82 by the cartridge or cartridges 26 in server 12.

Next, in step 84 the doOpCode( ) method of the cartridge or cartridges 26 are executed, passing in the command name and all of the parameters. In step 86, the doOpCode( ) method executes all of its code and it returns a Response object to the CartridgeLoader in the server 12. The CartridgeLoader in the server 12 returns this Response object to the portal coupled to the computer work station system 16 in step 88. In step 90 the Response object is sent back to the user at the computer work station system 16. In an alternative embodiment, if the computer work station system 16 is working independently as a system 10, than as described in greater detail above, the new cartridge or cartridges 26 are discovered, the method object is invoked in the cartridge or cartridges 26, and then the cartridge or cartridges 26 are executed.

Having thus described the basic concept of the invention, it will be rather apparent to those skilled in the art that the foregoing detailed disclosure is intended to be presented by way of example only, and is not limiting. Various alternations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A method for loading instructions into an executing process in a computer system, the method comprising:

executing a first application comprising at least one cartridge selected from a set of cartridges stored in memory;

instantiating a second application comprising at least one other one of the cartridges selected from the set of the cartridges with the first application during the execution of the first application, wherein the second application comprising the at least one other one of the cartridges modifies the first application; and executing the first application instantiated with the second application.

2. The method as set forth in claim 1 further comprising transmitting from a first system to a second system a first request for the second application, wherein the set of cartridges are stored in the memory of the second system and the instantiation of the second application with the first application is in response to the first request.

3. The method as set forth in claim 2 further comprising:

examining a directory for the set of cartridges to determine if the first system is authorized to have access to the at least one cartridge for the second application; and providing a notification signal if the examination reveals that the first system is not authorized to have access to the at least one cartridge for the second application.

4. The method as set forth in claim 1 further comprising:
examining a directory for the set of cartridges to determine if the at least one cartridge for the second application exists in the set of the cartridges; and
providing a notification signal if the examination reveals that the at least one cartridge for the second application does not exist in the set of the cartridges.

5. The method as set forth in claim 1 further comprising:
examining a directory for the set of cartridges to determine if more than one version of the at least one cartridge for the second application exists; and
selecting the version of the at least one cartridge for the second application which was created most recently for the instantiation with the first application if the examination determines that more than one version of the at least one cartridge for the second application exists.

6. The method as set forth in claim 1 further comprising:
determining if the at least one cartridge for the second application is compliant for the instantiation with the first application; and
providing a notification signal if the determination is that the at least one cartridge for the second application is not compliant.

7. The method as set forth in claim 1 further comprising providing a response based on the execution of the second application.

8. A computer readable medium having stored thereon instructions which, when executed by a processor, cause the processor to perform:
executing a first application comprising at least one cartridge in a set of cartridges;
instantiating a second application comprising at least one other one of the cartridges selected from the set of the cartridges with the first application during the execution of the first application, wherein the second application comprising the at least one other one of the cartridges modifies the first application; and
executing the first application instantiated with the second application.

9. The computer readable medium as set forth in claim 8 further comprising:
examining a directory for the set of cartridges to determine if the at least one cartridge for the second application exists in the set of the cartridges; and
providing a notification signal if the examination reveals that the at least one cartridge for the second application does not exist in the set of the cartridges.

10. The computer readable medium as set forth in claim 8 further comprising:
examining a directory for the set of cartridges to determine if more than one version of the at least one cartridge for the second application exists; and
selecting the version of the at least one cartridge for the second application which was created most recently for the instantiation with the first application if the examination determines that more than one version of the at least one cartridge for the second application exists.

11. The computer readable medium as set forth in claim 8 further comprising:
examining a directory for the set of cartridges to determine if an operator is authorized to have access to the at least one cartridge for the second application; and
providing a notification signal if the examination reveals that the operator is not authorized to have access to the at least one cartridge for the second application.

12. The computer readable medium as set forth in claim 8 further comprising:
determining if the at least one cartridge for the second application is compliant for the instantiation with the first application; and
providing an error signal if the determination is that the at least one cartridge for the second application is not compliant.

13. The computer readable medium as set forth in claim 8 further comprising providing a response based on the execution of the second application.

14. A system for loading instructions into a process being executed by a processor, the system comprising:
a memory device for storing a set of cartridges;
an instantiator that instantiates a first application comprising at least one cartridge selected from the set of the cartridges stored in the memory; and
an executing device configured to execute the instantiated first application, wherein the instantiator instantiates a second application comprising at least one other one of the cartridges with the first application during the execution of the first application, wherein the second application comprising the at least one other one of the cartridges modifies the first application, the executing device executing the first application instantiated with the second application.

15. The system as set forth in claim 14 further comprising:
an examination device that examines a directory for the set of cartridges to determine if the at least one cartridge for the second application exists in the set of the cartridges; and
a signal system that provides an error signal if the examination reveals that the at least one cartridge for the second application does not exist in the set of the cartridges.

16. The system as set forth in claim 14 further comprising:
an examination device that examines a directory for the set of cartridges to determine if more than one version of the at least one cartridge for the second application exists; and
a selecting device that selects the version of the at least one cartridge for the second application which was created most recently for the instantiation with the first application if the examination determines that more than one version of the at least one cartridge for the second application exists.

17. The system as set forth in claim 14 further comprising:
an examination device that examines a directory for the set of cartridges to determine if an operator is authorized to have access to the at least one cartridge for the second application; and
a signal system that provides an error signal if the examination reveals that the operator is not authorized to have access to the at least one cartridge for the second application.

18. The system as set forth in claim 14 further comprising:
a determination device that determines if the at least one cartridge for the second application is compliant for the instantiation with the first application; and
a signal system that provides an error signal if the determination is that the at least one cartridge for the second application is not compliant.

19. The system as set forth in claim 14 wherein the executing device provides a response based on the execution of the second application.

* * * * *